Nov. 26, 1957 E. A. ARNOLD 2,814,286
DEVICE FOR WARMING BEVERAGES
Filed April 12, 1955

Ernest A. Arnold
INVENTOR

BY *CA Snow & Co.*
ATTORNEYS.

United States Patent Office 2,814,286
Patented Nov. 26, 1957

2,814,286

DEVICE FOR WARMING BEVERAGES

Ernest A. Arnold, Monument, Kans.

Application April 12, 1955, Serial No. 500,795

3 Claims. (Cl. 126—43)

This invention relates to a device designed to maintain beverages such as coffee, tea or the like, at the desired temperature for consumption.

An important object of the invention is to provide a device of this character which includes a heating element such as a candle, lamp or the like, for supplying the desired heat to maintain the beverage in the cup at the preferred temperature, and to meet the requirements of the person drinking the beverage.

Still another object of the invention is to provide a device of this character including a base and a laterally swinging cup support mounted above said base and adapted to be swung to a position over the heating element, or to a position clear of the heating element should the beverage in the cup positioned in the device, become too hot.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing.

Figure 1:
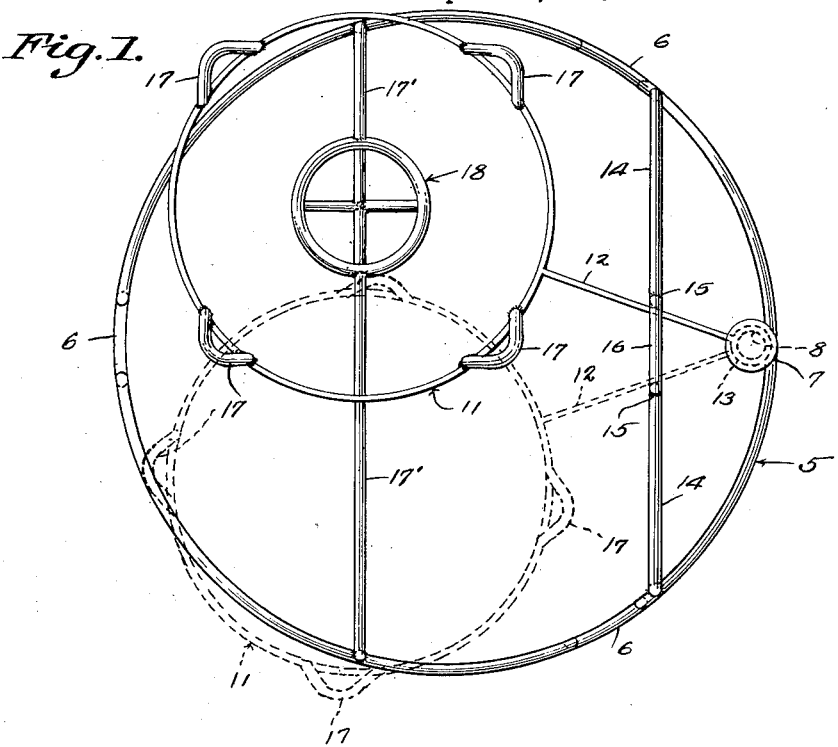
Figure 1 is a plan view of a heating device, constructed in accordance with the invention, the cup support being shown as moved laterally away from the heating element, in dotted lines.

Referring to the drawing in detail, the device comprises a base 5 which is comprised of a length of wire material bent to circular form and provided with downwardly extending offsets 6 providing supporting legs.

The base 5 also includes an eye member 7 in which the lower end of the threaded bolt 8 is secured as by means of the nuts 9 that are disposed on opposite sides of the eye member and grip the eye member.

Figure 2:
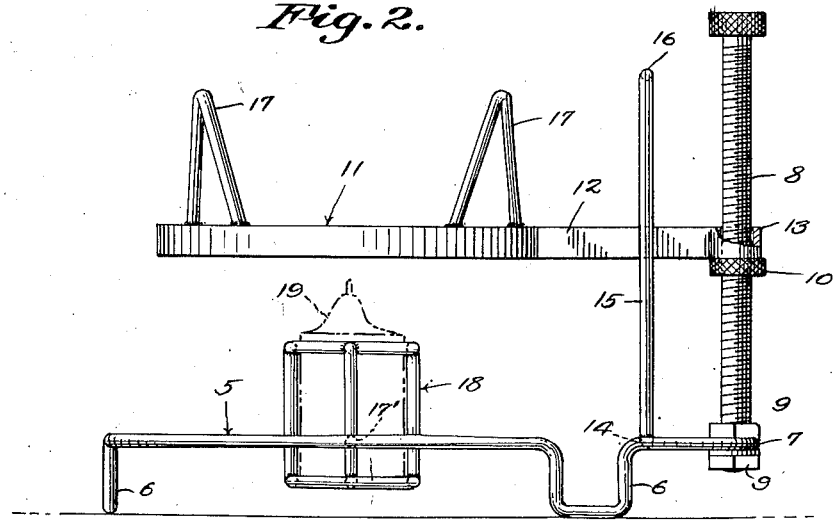
Figure 2 is a side elevational view of the device.

Operating longitudinally of the threaded bolt 8 is a nut 10, which nut provides a support for the pivoted cup supporting rack 11, which is also circular in formation and has extending from one side thereof an arm 12. This arm 12 is formed of substantially wide material and is formed with a circular bearing 13 fitted over the bolt 8 and resting on the nut 10, as better shown by Figure 2 of the drawing. Thus it will be seen that due to this construction, the cup supporting member is not only pivoted for lateral swinging movement, but is movable longitudinally in a vertical direction, with respect to the threaded bolt 8, to elevate the pivoted cup supporting rack for purposes to be hereinafter more fully described.

The reference character 14 indicates a stop bar that has right angled end portions 15, which are substantially long to secure the stop bar 14 in spaced relation with the base 5, a substantial distance.

The right angled end portions of the stop bar 14 are welded or otherwise secured to the base 5, at points adjacent to the eye member 7. This stop bar 14 is formed with a vertically offset portion 16 disposed intermediate the ends thereof, the offset portion being substantially wide.

The offset portion 16 accommodates the arm 12 and permits the arm 12 to swing laterally the length of the offset portion, the sides of the offset portion acting as stops to limit the lateral movement of the arm 12 and consequently the position of the cup supporting rack 11. This rack 11 is formed with curved guides 17 that are so disposed that they will grip the sides of a cup positioned on the pivoted cup supporting rack and support the cup in an upright position.

Secured to the transverse rod 17 that connects with the opposite sides of the base is a frame 18 which is arranged adjacent to one end of the transverse rod 17 as better shown by Figure 1 of the drawing.

This frame 18 provides a support for a heating element such as the candle 19, which is used in the present showing, although it is to be understood that a suitable heating element, either electric or oil lamp, may be used in lieu of the candle 19.

In the use of the device, a cup containing a beverage such as coffee or tea, is positioned on the pivoted cup supporting rack 11, and the candle 19 is lit. It is obvious that the heat from the candle will strike the bottom of the cup held in the support, maintaining the beverage in the cup warm at all times.

Should it be desired to permit the beverage to cool slightly, it is only necessary to swing the pivoted cup supporting rack laterally to the dotted line position as shown by Figure 1 of the drawing, whereupon the cup and its contents will be away from the direct heat from the candle or heating element used with the device, to the end that the cooling of the beverage will result.

Should it be desired to further heat the beverage, it is only necessary to swing the pivoted cup supporting rack to a position over the heating element to receive the direct heat therefrom.

Should it be desired to elevate the cup supporting rack or lower the cup supporting rack to meet various requirements, it is only necessary to operate the nut 10 which moves the rack vertically, according to the direction of rotation.

Having thus described the invention, what is claimed is:

1. A device for heating a vessel and beverage contained therein comprising an annular base formed of relatively rigid wire bent in circular form, a plurality of U-shaped supporting members integral with said base, an inwardly projecting eye integral with said base, a pair of transversely disposed bars secured to said base, a vertical threaded bolt extending through said eye, upper and lower nuts securing said bolt to said eye, a ring-shaped rack having a diameter substantially less than the diameter of said base, a supporting bar extending from said rack, a sleeve carried by said supporting bar and loosely engaging about said bolt, a rack adjusting nut on said bolt engaging the lower end of said sleeve, and a heating element support carried by one of said transverse bars.

2. A device for heating a vessel and beverage contained therein comprising an annular base formed of relatively rigid wire bent in circular form, a plurality of U-shaped supporting members integral with said base, an inwardly projecting eye integral with said base, a pair of transversely disposed bars secured to said base, a vertical threaded bolt extending through said eye, upper and lower nuts securing said bolt to said eye, a ring-shaped rack having a diameter substantially less than the diameter of said base, a supporting bar extending from said rack, a sleeve carried by said supporting bar and loosely engaging about said bolt, a rack adjusting nut on said bolt engaging the lower end of said sleeve, a heating element support carried by one of said transverse bars, and an inverted U-shaped stop member carried by the other of said transverse bars, said supporting bar loosely engaging between the upright parallel arms of said stop member.

3. A device for heating a vessel and beverage contained therein comprising an annular base formed of relatively rigid wire bent in circular form, a plurality of U-shaped supporting members integral with said base, an inwardly projecting eye integral with said base, a pair of transversely disposed bars secured to said base, a vertical threaded bolt extending through said eye, upper and lower nuts securing said bolt to said eye, a ring-shaped rack having a diameter substantially less than the diameter of said base, a supporting bar extending from said rack, a sleeve carried by said supporting bar and loosely engaging about said bolt, a rack adjusting nut on said bolt engaging the lower end of said sleeve, a heating element support carried by one of said transverse bars, and a plurality of inverted V-shaped guard members carried by said rack.

References Cited in the file of this patent

UNITED STATES PATENTS

| | | |
|---|---|---|
| 479,254 | Duke | July 19, 1892 |
| 509,222 | Higbie | Nov. 21, 1893 |
| 652,170 | Dibble | June 19, 1900 |
| 1,793,326 | Knupffer | Feb. 17, 1931 |

FOREIGN PATENTS

| | | |
|---|---|---|
| 23,371 | Great Britain | Dec. 5, 1893 |
| 572,750 | Great Britain | Oct. 22, 1945 |